(12) United States Patent
Davies et al.

(10) Patent No.: US 10,894,495 B2
(45) Date of Patent: Jan. 19, 2021

(54) SEAT ASSEMBLY INCLUDING AN ARMREST WITH A LEVER HANDLE AND METHOD FOR MAKING THE SAME

(71) Applicant: Gulfstream Aerospace Corporation, Savannah, GA (US)

(72) Inventors: Richard Davies, Savannah, GA (US); Jeremiah Mallette, Savannah, GA (US); Aram Kasparian, Savannah, GA (US); Timothy O'Hara, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 16/425,666

(22) Filed: May 29, 2019

(65) Prior Publication Data

US 2020/0376995 A1 Dec. 3, 2020

(51) Int. Cl.
*B60N 2/90* (2018.01)
*B60N 2/75* (2018.01)

(52) U.S. Cl.
CPC ............... *B60N 2/76* (2018.02); *B60N 2/797* (2018.02)

(58) Field of Classification Search
CPC .................................. B60N 2/76; B60N 2/797
USPC ........................................ 297/463.1, 463.2
See application file for complete search history.

(56) References Cited

U.S. PATENT DOCUMENTS

| 2,638,151 A | 5/1953 | Gordon |
| 3,224,808 A * | 12/1965 | Spielman ............. B64D 11/064 297/341 |
| 3,276,816 A | 10/1966 | Edwards |
| 3,778,103 A | 12/1973 | Edwards |
| 4,012,014 A * | 3/1977 | Marshall ............. B64C 13/0421 244/234 |
| 4,310,196 A | 1/1982 | Vogel |
| 4,380,938 A * | 4/1983 | Olson ..................... F16H 59/02 251/229 |

(Continued)

FOREIGN PATENT DOCUMENTS

| DE | 1256076 B | 12/1967 |
| DE | 2460192 A1 | 6/1976 |

(Continued)

OTHER PUBLICATIONS

European Patent Office, European Search Report for Application No. 20175319.1, dated Oct. 5, 2020.

*Primary Examiner* — Rodney B White
(74) *Attorney, Agent, or Firm* — LKGlobal | Lorenz & Kopf, LLP

(57) ABSTRACT

Seat assemblies and methods for making seat assembly are provided. In one example, a seat assembly includes a seat base and a seat backrest. An armrest is disposed adjacent to the seat base and has an upper armrest section that extends towards a forward armrest section for supporting an arm of a seat occupant. A lever handle is disposed within a hand-length below the upper armrest section such that the lever handle is accessible to a hand of the seat occupant while at least a portion of the arm of the seat occupant is supported on the upper armrest section. A lever arm has a first end coupled to the lever handle and a second end pivotally coupled to a part of the armrest that is disposed below the upper armrest section such that the lever handle moves in an arcuate upward direction when actuated.

19 Claims, 6 Drawing Sheets

(56) References Cited

U.S. PATENT DOCUMENTS

| | | | | |
|---|---|---|---|---|
| 4,491,325 A * | 1/1985 | Bersheim | ............... | A63F 13/06 |
| | | | | 463/38 |
| 4,494,793 A | 1/1985 | Rogers, Jr. | | |
| 4,588,226 A * | 5/1986 | Young | ..................... | A47C 3/18 |
| | | | | 248/425 |
| 4,671,572 A * | 6/1987 | Young | ..................... | A47C 3/18 |
| | | | | 248/425 |
| 4,756,528 A * | 7/1988 | Umashankar | ........... | A63F 13/08 |
| | | | | 463/1 |
| 5,244,066 A * | 9/1993 | Mackoway | ........... | E02F 9/2004 |
| | | | | 192/13 R |
| 5,458,399 A * | 10/1995 | Gezari | ................... | B60N 2/797 |
| | | | | 297/463.1 X |
| 5,566,778 A * | 10/1996 | Valier | .................... | B60K 20/02 |
| | | | | 180/334 |
| 5,961,179 A * | 10/1999 | Dixon | ................... | A47B 21/00 |
| | | | | 297/463.1 X |
| 6,065,560 A * | 5/2000 | Palmeri | ................. | B60K 20/02 |
| | | | | 180/326 |
| 6,152,676 A * | 11/2000 | Evert | ....................... | B66F 9/20 |
| | | | | 180/333 |
| 6,450,278 B1 * | 9/2002 | Shirogami | ........... | E02F 9/2004 |
| | | | | 180/315 |
| 6,936,935 B2 * | 8/2005 | Dinkel | ................... | B60N 2/797 |
| | | | | 307/9.1 |
| 6,938,957 B2 | 9/2005 | Beatty et al. | | |
| 7,290,635 B2 * | 11/2007 | Bisick | .................... | B60N 2/797 |
| | | | | 180/272 |
| 8,376,462 B2 * | 2/2013 | Marini | .................. | B64D 11/06 |
| | | | | 297/344.24 |
| 8,601,896 B2 * | 12/2013 | Skogward | .............. | B60K 20/04 |
| | | | | 74/473.23 |
| 9,120,557 B2 * | 9/2015 | Antraygue | ............. | G05G 9/047 |
| 10,266,071 B2 * | 4/2019 | Kleiber | .................. | B60N 2/797 |
| 10,279,917 B1 * | 5/2019 | Wilkey | .................... | F16C 1/14 |
| 10,331,233 B2 * | 6/2019 | Parazynski | ............ | G06F 3/0346 |
| 2011/0084527 A1 | 4/2011 | Marini et al. | | |
| 2014/0159436 A1 | 6/2014 | Iacobucci | | |
| 2017/0267255 A1 * | 9/2017 | Numazawa | ............ | B60K 28/00 |
| 2018/0312084 A1 * | 11/2018 | Does | ........................ | B60N 2/20 |

FOREIGN PATENT DOCUMENTS

| | | | | |
|---|---|---|---|---|
| DE | 4110890 A1 | 10/1992 | | |
| DE | 19507952 A1 * | 9/1995 | ............... | G05G 1/02 |
| FR | 2948328 A1 | 1/2011 | | |
| GB | 1058208 A | 2/1967 | | |
| JP | H110165255 A | 6/1998 | | |
| JP | 2005335447 A * | 12/2005 | ............... | B66F 9/20 |
| KR | 101164782 B1 | 7/2012 | | |

* cited by examiner

SEAT ASSEMBLY INCLUDING AN ARMREST WITH A LEVER HANDLE AND METHOD FOR MAKING THE SAME

TECHNICAL FIELD

The technical field relates generally to seat assemblies, and more particularly, relates to seat assemblies, such as for an aircraft or the like, that include an armrest with a lever handle that can be actuated, for example, for changing a position of the seat assembly.

BACKGROUND

Current seat assemblies, for example, for the commercial and/or military transportation industries (e.g., aircraft, motor vehicles, and the like) often include one or more buttons or devices that can be actuated to adjust or otherwise change a position of the seat assembly. For example, a seat assembly may include one or more buttons that can be pushed to adjust the angle of the seat backrest, the lumbar support, raise a leg rest support from the seat base, track and/or swivel the seat assembly, and/or the like. Unfortunately, many such seat assemblies are ergonomically unfriendly and require that the seat occupant move from a comfortable seated position to a less comfortable, extended position in order to push the one or more buttons and/or devices to change the position of their seat.

Accordingly, it is desirable to provide seat assemblies that are more ergonomically friendly, for example, for adjusting or otherwise changing a position of the seat assembly, and methods for making such assemblies. Furthermore, other desirable features and characteristics of the various embodiments described herein will become apparent from the subsequent detailed description and the appended claims, taken in conjunction with the accompanying drawings and this background.

SUMMARY

Various non-limiting embodiments of a seat assembly for supporting a seat occupant and a method for making a seat assembly for supporting a seat occupant are provided herein.

In a first non-limiting embodiment, the seat assembly includes, but is not limited to, a seat base that extends from a rearward seat base section to a forward seat base section. The seat assembly further includes, but is not limited to, a seat backrest that extends substantially upright from the rearward seat base section. The seat assembly further includes, but is not limited to, an armrest that is disposed adjacent to the seat base. The armrest extends from a rearward armrest section to a forward armrest section that is forward of the seat backrest. The armrest has an upper armrest section that extends towards the forward armrest section and that is configured for supporting an arm of the seat occupant. The armrest includes, but is not limited to, a lever handle that is disposed within a hand-length below the upper armrest section such that the lever handle is accessible to a hand of the seat occupant while at least a portion of the arm of the seat occupant is supported on the upper armrest section. The armrest further includes, but is not limited to, a lever arm. The lever arm has a first end coupled to the lever handle and a second end pivotally coupled to a part of the armrest that is disposed below the upper armrest section such that the lever handle moves in an arcuate upward direction when actuated by the hand of the seat occupant.

In another non-limiting embodiment, the method includes, but is not limited to, arranging a seat backrest extending substantially upright from a rearward seat base section of a seat base. The seat base extends forward from the rearward seat base section to a forward seat base section. The method further includes, but is not limited to, disposing an armrest adjacent to the seat base. The armrest extends from a rearward armrest section to a forward armrest section that is forward of the seat backrest. The armrest has an upper armrest section that is configured for supporting an arm of the seat occupant. The method further includes, but is not limited to, coupling a first end of a lever arm to a lever handle. The method further includes, but is not limited to, disposing the lever handle within a hand-length below the upper armrest section such that the lever handle is accessible to a hand of the seat occupant while at least a portion of the arm of the seat occupant is supported on the upper armrest section. The method further includes, but is not limited to, pivotably coupling a second end of the lever arm to a part of the armrest that is disposed below the upper armrest section such that the lever handle moves in an arcuate upward direction when actuated by the hand of the seat occupant.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to seat assemblies for supporting a seat occupant and methods for making such seat assemblies. In an exemplary embodiment, a seat assembly includes a seat base that extends from a rearward seat base section to a forward seat base section. A seat backrest extends substantially upright from the rearward seat base section. An armrest is disposed adjacent to the seat base. The armrest extends from a rearward armrest section to a forward armrest section that is forward of the seat backrest. The armrest has an upper armrest section that extends towards the forward armrest section for supporting an arm of a seat occupant.

The armrest includes a lever handle that is disposed within a hand-length below the upper armrest section such that the lever handle is accessible to a hand of the seat occupant while at least a portion of the arm of the seat occupant is supported on the upper armrest section. A lever arm has a first end coupled to the lever handle and a second end pivotally coupled to a part of the armrest that is disposed below the upper armrest section such that the lever handle moves in an arcuate upward direction by the hand of the seat occupant when actuated. In an exemplary embodiment, a cable is operatively coupled to the lever arm to move when the lever handle is actuated for adjusting a position of the seat assembly.

In an exemplary embodiment, advantageously it has been found that by positioning the lever handle adjacent to the upper armrest section such that the lever handle can be accessed by the seat occupant while at least a portion of the seat occupant's arm is supported on the upper armrest section, the seat occupant does not need to move from a comfortable seated position to a less comfortable, extended position to actuate the lever handle. Further, in an exemplary embodiment, advantageously it has been found that by pivotally coupling the lever arm to the part of the armrest that is disposed below the upper armrest section such that the lever handle, which is coupled to the lever arm, is actuatable or otherwise moveable in an arcuate upward direction by the hand of the seat occupant, the seat occupant can actuate the lever handle in an ergonomically friendly manner simply by pulling the lever handle with an upward motion of the hand rotating from the wrist, which is still comfortably positioned on the upper armrest section, thereby not requiring the seat occupant to move from a comfortable seated position to actuate the lever handle.

Figure 1:
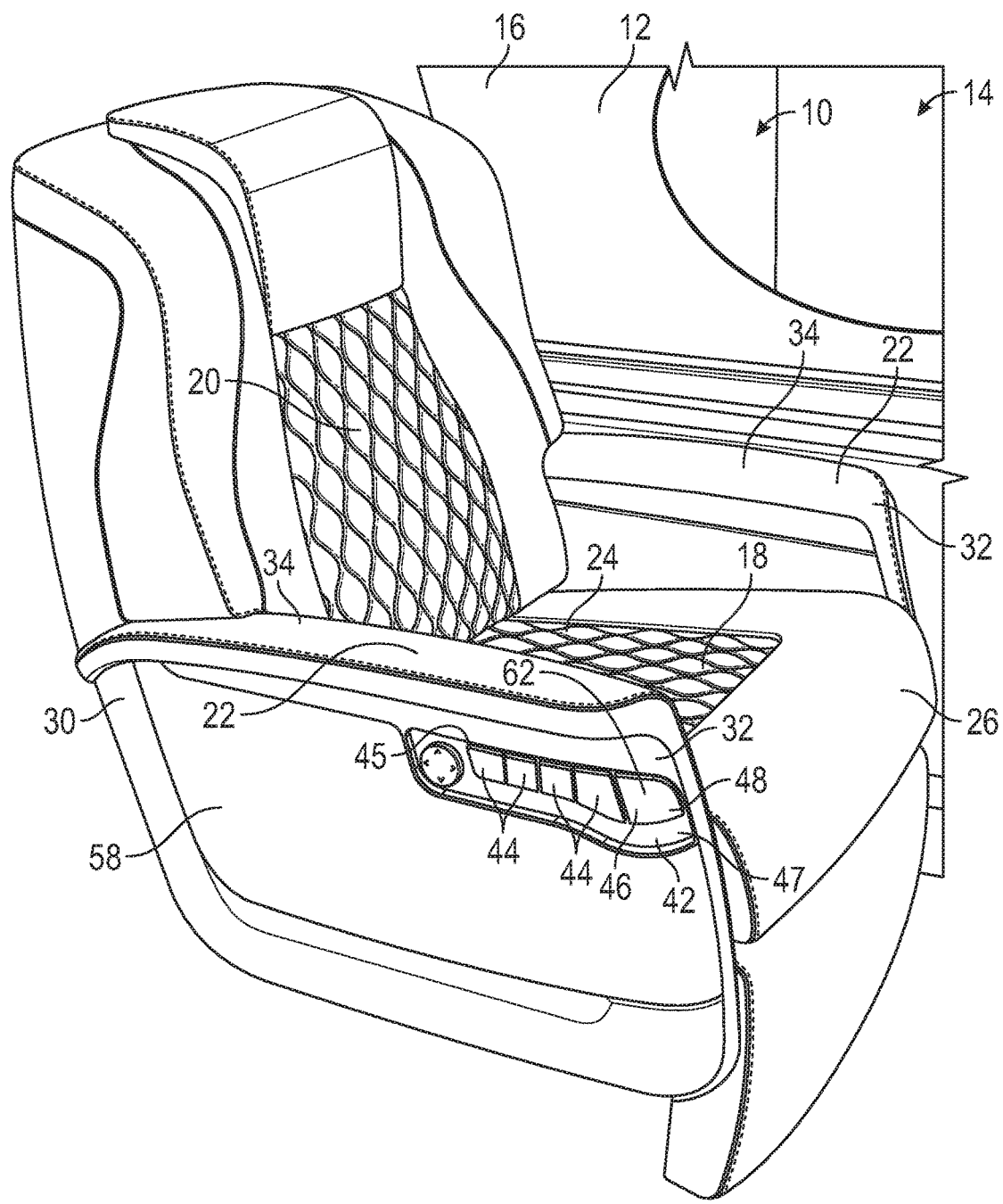
FIG. 1 illustrates a perspective view of a seat assembly including an armrest in accordance with an exemplary embodiment.

FIG. 1 illustrates a perspective view of a seat assembly 10 in accordance with an exemplary embodiment. As illustrated, the seat assembly 10 is arranged adjacent to an outboard sidewall 12 in a cabin area 14 of an aircraft 16. Although the seat assembly 10 is illustrated as being arranged in the cabin area 14 of the aircraft 16, it is to be understood that the seat assembly 10 may be arranged in other areas, such as within other areas of the aircraft 16 or within other non-aircraft type structure(s), for example within an interior area of a motor vehicle or the like.

The seat assembly 10 includes a seat base 18, a seat backrest 20, and armrests 22. The armrests 22 are disposed adjacent to the seat base 18 and forward of the seat backrest 20, one correspondingly adjacent to the outboard sidewall 12 and the other adjacent to the inboard side (opposite the outboard sidewall 12) of the cabin area 14, respectively.

As illustrated, the seat base 18 extends from a rearward seat base section 24 to a forward seat base section 26. The seat backrest 20 extends substantially upright from the rearward seat base section 24 of the seat base 18. In one example, the seat backrest 20 is fixedly coupled to the seat base 18 such that the seat backrest 20 is permanently set in a substantially upright configuration. In another example, the seat assembly 10 is an adjustable seat assembly in which the seat backrest 20 is pivotably coupled to the seat base 18 for movement between a substantially upright position and, for example, a substantially reclined and/or inclined (e.g., forward leaning) position(s).

Figure 3:
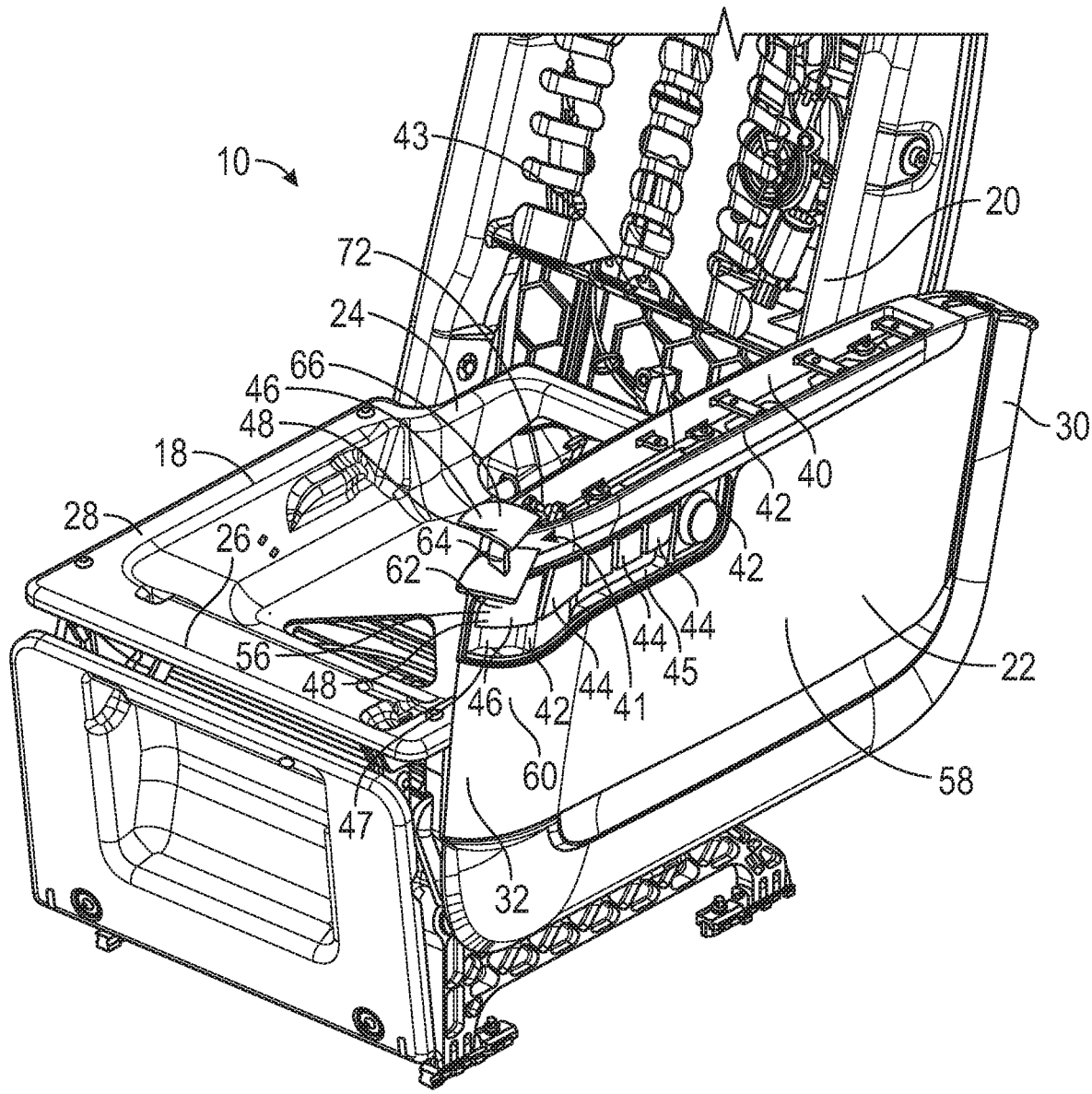
FIG. 3 illustrates a perspective tear-away view of a seat assembly including an armrest with a lever handle being actuated in accordance with an exemplary embodiment.

Referring also to FIG. 3, the seat assembly 10 includes a seat frame 28 that forms at least part of the seat base 18 and the seat backrest 20 and supports the seat backrest 20 extending substantially upright from the seat base 18 as discussed above. The seat frame 28 is formed of a relatively rigid support material such as metal, e.g., aluminum or the like, composite, or any other frame structure material(s) known to those skilled in the art.

Further, the seat base 18 and the seat backrest 20 each include cushions and/or other soft covering material(s) that is disposed over the seat frame 28. Non-limiting examples of soft covering materials for the seat base 18 and/or the seat backrest 20 include leather, cloth or textile fabric (e.g., woven or knitted construction), thermoplastic skin material such as TPO, PVC, or the like, a multi-layer construction including a foam layer covered by a soft skin material layer, or any other suitable interior trim outer flexible and/or soft skin material. The relatively soft covering material may be formed using a conventional leather forming process, a thermoforming process, a slush or rotational molding process, a foaming process, and/or other conventional process for forming an interior trim outer skin and/or material.

Figure 2:
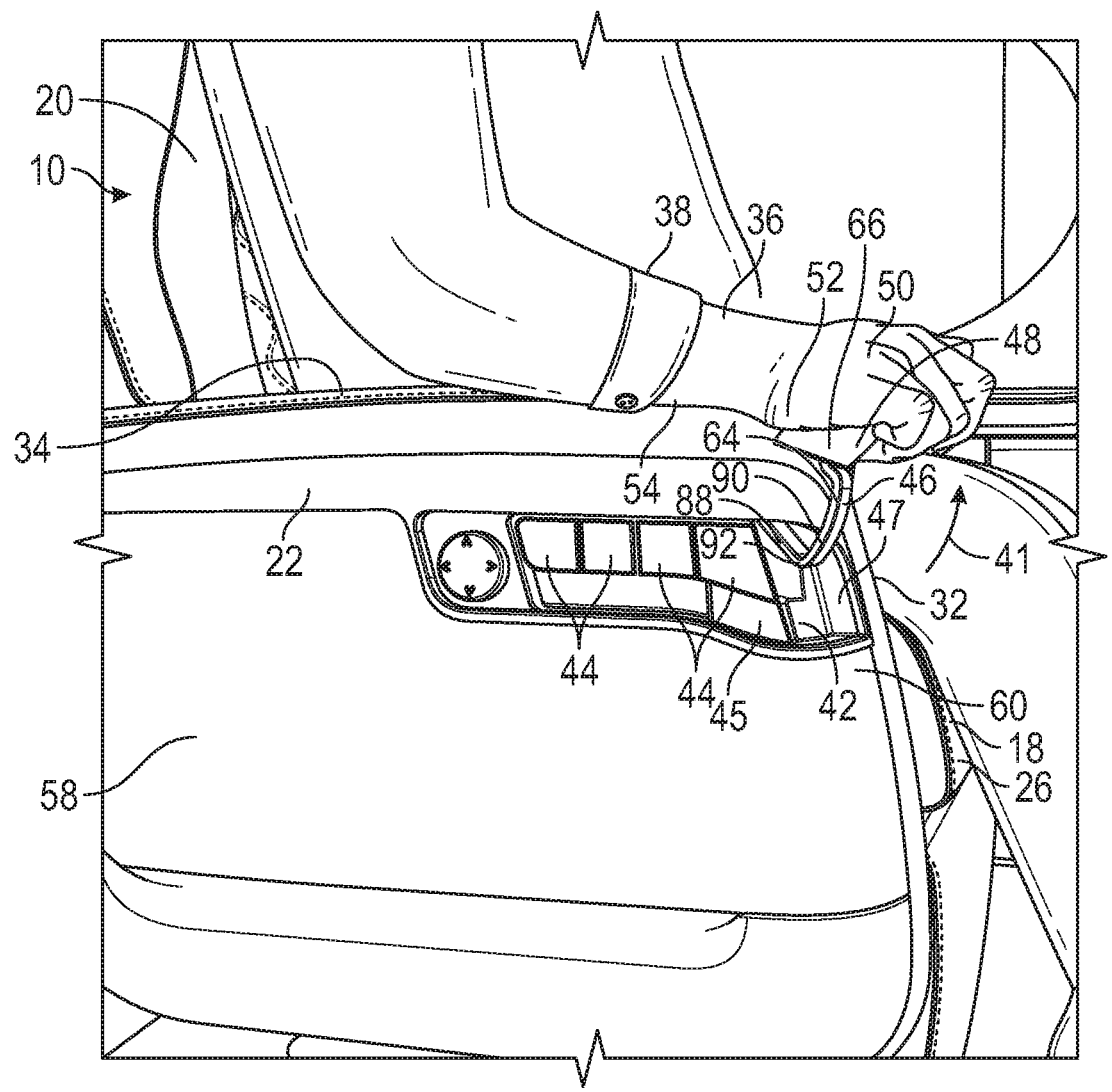
FIG. 2 illustrates a perspective view of a seat assembly including an armrest with a lever handle being actuated by a hand of a seat occupant in accordance with an exemplary embodiment.

The armrests 22 are directly or indirectly coupled to the seat frame 28, for example, via brackets, welding, threaded fasteners, and/or the like. Referring to FIGS. 1-3, the armrests 22 extend from a rearward armrest section 30 to a forward armrest section 32 that is forward of the seat backrest 20. Each of the armrest 22 has an upper armrest section 34 that extends from the rearward armrest section 30 towards the forward armrest section 32. As illustrated, the upper armrest sections 34 support the arms 36 of a seat occupant 38, for example when seated in the seat assembly 10 supported by the seat base 18 and seat backrest 20.

In an exemplary embodiment, the armrests 22 each includes an armrest structure 40 for supporting the armrest 22. The armrest structures 40 are coupled to the seat frame 28. The armrest structure 40 is formed of a relatively rigid support material such as metal, e.g., aluminum or the like, composite, or any other frame structure material(s) known to those skilled in the art.

Various trim panels, cushions, and/or other soft covering materials may be disposed over the armrest structure 40. As illustrated, the upper armrest section 34 is formed of a soft covering material, e.g., including foam padding) for supporting the arm 36 of the seat occupant 38. Non-limiting examples of soft covering materials for the armrest 22 and/or the upper armrest section 34 include leather, cloth or textile fabric (e.g., woven or knitted construction), thermoplastic skin material such as TPO, PVC, or the like, a multi-layer construction including a foam layer covered by a soft skin material layer, or any other suitable interior trim outer flexible and/or soft skin material.

In an exemplary embodiment, at least one of the armrest 22 includes an armrest housing 42 that has an interior portion 43 coupled to the armrest structure 40 and an outer exposed portion 47 that defines an outer pocket 45. The armrest housing 42 is formed of a relatively rigid support material, such as metal, composite, rigid plastic, or the like. Further, the outer exposed portion 47 of the armrest housing may be decorated, for example including a molded in color, decorative paint, decorative coating, and/or the like. The armrest housing 42 may be attached directly or indirectly to the armrest structure 40, for example, via threaded fasters, brackets, and/or the like.

As illustrated, the outer pocket 45 of the armrest housing 42 has a plurality of actuating elements 44 and 46 disposed therein. The actuating elements 44 may be buttons or other devices that can be manually actuated, for example, by pressing and/or pulling to actuate an internal seat mechanism(s) (not shown) to adjust or alter a position of the seat assembly 10. For example, one or more of the actuating elements 44 may be actuated to adjust an angle of the seat backrest 20, a lumbar support, raise a leg rest support from the seat base 18, and/or the like.

As will be discussed in further detail below, the actuating element 46 includes a lever handle 48 that can be pulled or otherwise actuated in an arcuate upward direction (indicated by single headed arrow 41) to adjust a position of the seat assembly 10. In an exemplary embodiment, the lever handle 48 is disposed within a hand-length below the upper armrest section 34 such that the lever handle 48 is accessible to the hand 50 of the seat occupant 38 while at least a portion of their arm 36 is supported on the upper armrest section 34. As used herein, the term "within a hand-length" refers to a length that is accessible to a hand of a seat occupant by extension and/or retraction of the fingers and/or pivoting of the hand about the wrist while keeping the forearm stationary, such as from about 5 to about 200 mm, for example, from about 25 to about 160 mm. In one example, the lever handle 48 is accessible to the hand 50 of the seat occupant 38 while their wrist 52 or their wrist 52 and forearm 54 is/are supported on the upper armrest section 34.

In an exemplary embodiment, the lever handle 48 is at least partially disposed in the forward armrest section 32 just below the upper armrest section 34 so that the seat occupant 38 can conveniently grab the lever handle 48 in a nominal position 56 (e.g. stowed or un-actuated position) with their hand 50 by extending their fingers into contact with the lever handle 48 while their wrist 52 and/or forearm is supported on a forward portion of the upper armrest section 34. As illustrated, the armrest 22 has an outer armrest side 58 on a side opposite the seat base 18. The outer armrest side 58 extends from the rearward armrest section 30 to the forward armrest section 32 below the upper armrest section 34. A curved outer armrest corner 60 forms a transition between the outer armrest side 58 and the forward armrest section 32. In an exemplary embodiment, the lever handle 48 has a curved, exposed outer surface 62 that extends from the forward armrest section 32 and along the curved outer armrest corner 60 to the outer armrest side 58. In one example, the exposed outer surface 62 of the lever handle 48 conforms and/or substantially matches the contour of the curved outer armrest corner 60.

Figure 4:
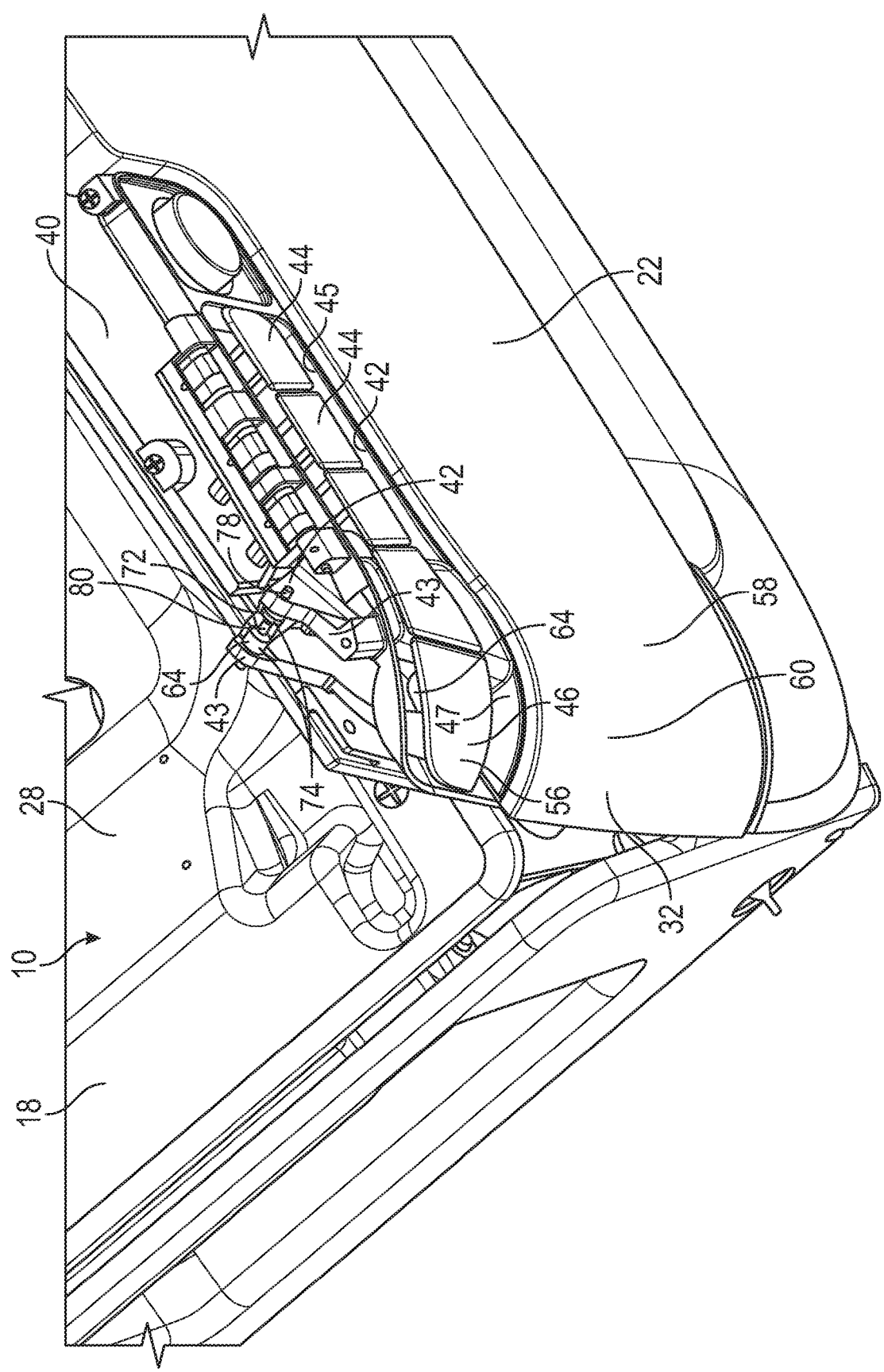
FIG. 4 illustrates a perspective tear-away top view of a portion of a seat assembly including an armrest with a lever handle in accordance with an exemplary embodiment.
Figure 5:
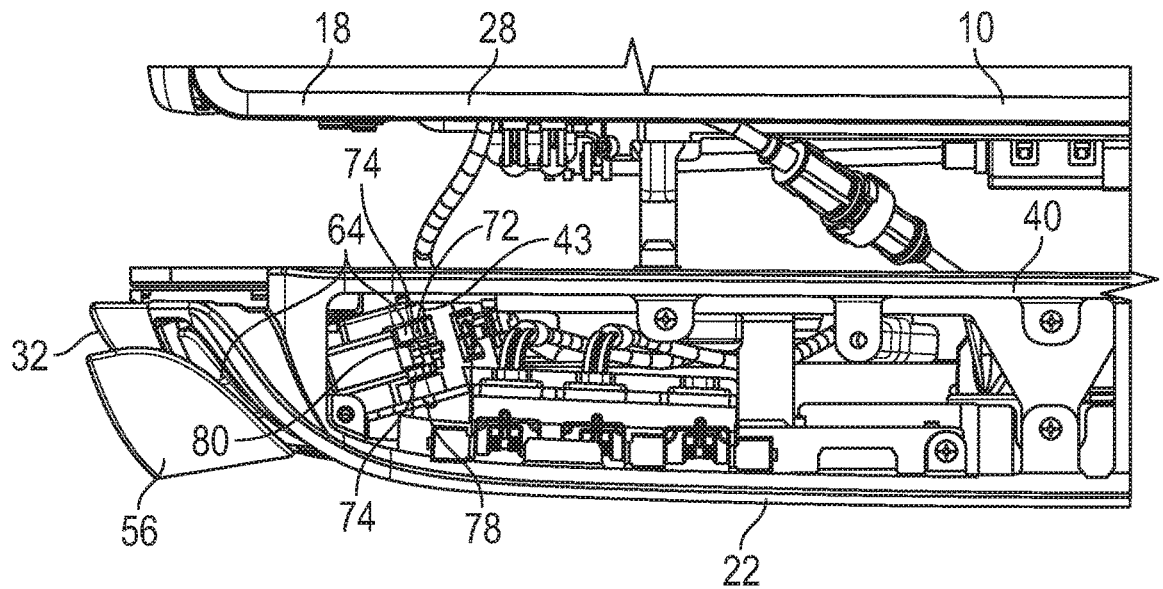
FIG. 5 illustrates a tear-away top view of a portion of a seat assembly including an armrest with a lever handle in accordance with an exemplary embodiment.
Figure 6:
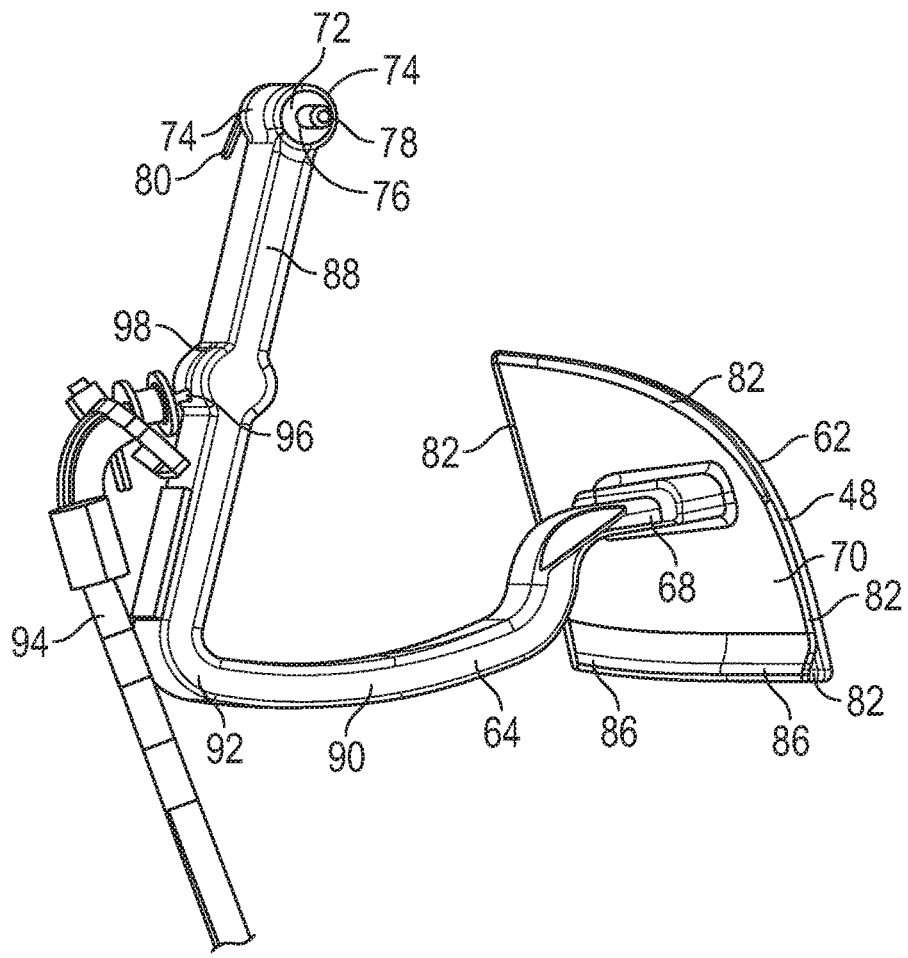
FIG. 6 illustrates a perspective view of a lever hand, a lever arm, and a cable for a seat assembly in accordance with an exemplary embodiment.

Referring also to FIGS. 4-6, the actuating element 46 further includes a lever arm 64 that is operatively coupled to the lever handle 48 such that the lever handle 48 can be pulled or otherwise manually moved from the nominal position 56 in the arcuate upward direction 41 to an actuated position 66 when actuated by the hand 50 of the seat occupant 38, for example, to adjust the position of the seat assembly 10. As illustrated, the lever arm 64 has an end 68 coupled to an inner surface 70 of the lever handle 48 and an end 72 that is pivotally coupled to the interior portion 43 of the armrest housing 42 that is disposed rearward of the forward armrest section 32 just below and adjacent to the upper armrest section 34. As such, when the lever handle 48 is actuated from the nominal position 56, the end 72 of the lever arm 64 pivots relative to the interior portion 43 of the armrest housing 42 to guide or otherwise limit motion of the lever handle 48 along the arcuate upward direction 41 to the actuated position 66, for example, while at least a portion of the arm of the seat occupant remains stationary and supported on the upper armrest section.

In an exemplary embodiment, the end 72 of the lever arm 64 is a dual pronged end including prongs 74 that are spaced apart. Openings 76 that are aligned are correspondingly formed through the prongs 74. A pin 78 is disposed through the openings 76 and is coupled to the interior portion 43 of the armrest housing 42 to rotationally couple the end 72 of the lever arm 64 to the armrest housing 42. As illustrated, a biasing element 80 (e.g., wire spring, leaf spring, or the like) is coupled to the end 72 of the lever arm 64 and is arranged between the prongs 74. The biasing element 80 is in pressing contact with the interior portion 43 of the armrest housing 42 to bias the lever handle 48 in the nominal position 56 and to provide a light resistance when the lever handle 48 is actuated to the actuated position 66.

In an exemplary embodiment and as illustrated in FIG. 6, the lever handle 48 has a perimeter edge 82 that forms a transition between the exposed outer surface 62 and the inner surface 70 of the lever handle 48. Just above or adjacent to the lower perimeter edge section 84 of the perimeter edge 82, the lever handle 48 has a ridged portion that defines a finger grip 86 on the inner surface 70 to facilitate gripping of the lower portion of the lever handle 48 by the fingertips of the seat occupant 38.

Referring to FIGS. 2-3 and 6, in an exemplary embodiment, the lever arm 64 has a proximal section 88 that includes the end 72, a distal section 90 that includes the end 68, and an elbow section 92 that is disposed between and couples the proximal section 88 to the distal section 90. To facilitate an ergonomically friendly actuation and motion of the lever handle 48 by the hand 50 of the seat occupant 38, when the lever handle 48 is manually moved from the nominal position 56 to the actuated position 66, the proximal section 88 extends in a generally downward and forward direction from the end 72 to the elbow section 92 and the distal section 90 extends in a generally forward and upward direction from the elbow section 92 to the end 68 so that the lever handle 48 moves along the arcuate upward direction 41.

In an exemplary embodiment, a cable 94 is operatively coupled to the proximal section 88 of the lever arm 64 to move when the lever handle 48 is actuated for adjusting a position of the seat assembly 10. In particular, the cable 94 has an end section 96 that is coupled to the proximal section 88 of the lever arm 64 and an opposing end section that is coupled to an internal seat mechanism (not shown) that when actuated, adjust or allows adjustment of a position of the seat assembly 10. For example, the position of the seat assembly 10 may be adjusted fore, aft, side to side, and/or rotationally when the lever handle 48 is actuated. In an exemplary embodiment, the proximal section 88 of the lever arm 64 has a slot 98 formed therein. The end section 96 of the cable 94 is disposed through the slot 98 and is coupled to the proximal section 88 of the lever arm 64 adjacent to the slot 98.

Figure 7:
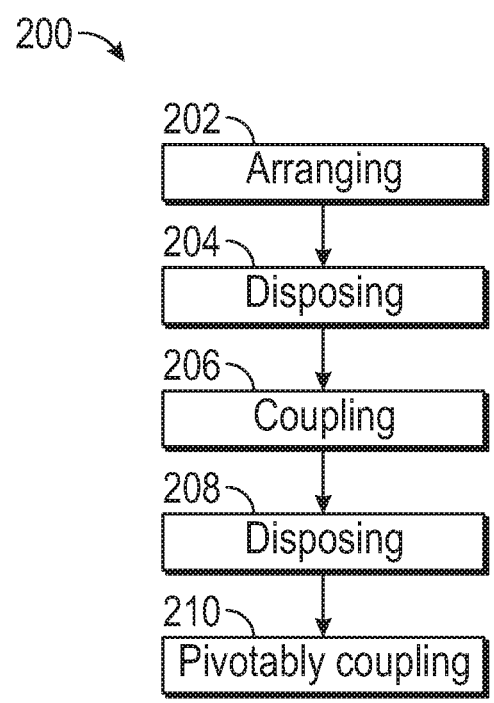
FIG. 7 illustrates a method for making a seat assembly for supporting a seat occupant in accordance with an exemplary embodiment.

Referring to FIG. 7, a method 200 for making a seat assembly for supporting a seat occupant in accordance with an exemplary embodiment is provided. The method 200 includes arranging (STEP 202) a seat backrest extending substantially upright from a rearward seat base section of a seat base. The seat base extends forward from the rearward seat base section to a forward seat base section.

The method 200 further includes disposing (STEP 204) an armrest adjacent to the seat base. The armrest extends from a rearward armrest section to a forward armrest section that is forward of the seat backrest. The armrest has an upper armrest section that is configured for supporting an arm of the seat occupant.

The method 200 further includes coupling (STEP 206) a first end of a lever arm to a lever handle. The lever handle is disposed (STEP 208) within a hand-length below the upper armrest section such that the lever handle is accessible to a hand of the seat occupant while at least a portion of the arm of the seat occupant is supported on the upper armrest section. A second end of the lever arm is pivotally coupled (STEP 210) to a part of the armrest that is disposed below the upper armrest section such that the lever handle is actuatable in an arcuate upward direction by the hand of the seat occupant.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A seat assembly for supporting a seat occupant, the seat assembly comprising:
    a seat base extending from a rearward seat base section to a forward seat base section;
    a seat backrest extending substantially upright from the rearward seat base section; and
    an armrest disposed adjacent to the seat base and extending from a rearward armrest section to a forward armrest section that is forward of the seat backrest, the armrest having an upper armrest section extending towards the forward armrest section and configured for supporting an arm of the seat occupant, wherein the armrest comprises:
        a lever handle disposed within a hand-length below the upper armrest section such that the lever handle is accessible to a hand of the seat occupant while at least a portion of the arm of the seat occupant is supported on the upper armrest section; and
        a lever arm having a first end coupled to the lever handle and a second end pivotally coupled to a part of the armrest that is disposed below the upper armrest section such that the lever handle moves in an arcuate upward direction when actuated by the hand of the seat occupant, wherein the armrest has an outer armrest side on a side opposite the seat base and extending from the rearward armrest section to the forward armrest section below the upper armrest section, and wherein the lever handle is at least partially disposed in the outer armrest side.

2. The seat assembly of claim 1, wherein the lever handle is partially disposed in the outer armrest side and is partially disposed in the forward armrest section.

3. The seat assembly of claim 1, wherein the armrest has a curved outer armrest corner that forms a transition between the outer armrest side and the forward armrest section, and wherein the lever handle is at least partially disposed in the curved outer armrest corner.

4. The seat assembly of claim 1, wherein the second end of the lever arm is pivotally coupled to the part of the armrest that is disposed rearward of the forward armrest section and adjacent to the upper armrest section, and wherein the lever handle is positioned on the armrest such that when actuated, the lever handle moves along the arcuate upward direction via the hand of the seat occupant such that the at least the portion of the arm of the seat occupant remains stationary and supported on the upper armrest section.

5. The seat assembly of claim 1, wherein the at least the portion of the arm of the seat occupant includes a wrist of the seat occupant, and wherein the lever handle is disposed below the upper armrest section such that the lever handle is accessible to the hand of the seat occupant while the wrist of the seat occupant is supported on the upper armrest section.

6. The seat assembly of claim 1, wherein the lever handle has an exposed outer surface and an inner surface opposite the exposed outer surface, and wherein
    the first end of the lever arm is coupled to the inner surface of the lever handle.

7. The seat assembly of claim 6, wherein the lever handle has a perimeter edge that forms a transition between the exposed outer surface and the inner surface, and wherein the perimeter edge includes a lower perimeter edge section, and wherein the lever handle defines a finger grip on the inner surface adjacent to the lower perimeter edge section.

8. The seat assembly of claim 1, wherein the lever arm and the lever handle cooperate to direct movement of the lever handle along the arcuate upward direction from a nominal position to an actuated position when actuated by the hand of the seat occupant, and wherein the seat assembly further comprises a biasing element that is operatively coupled to the lever arm to bias the lever handle in the nominal position.

9. The seat assembly of claim 8, wherein the biasing element is one of proximate to and disposed at the second end of the lever arm.

10. The seat assembly of claim 9, wherein the second end of the lever arm is a dual pronged end including a first prong and a second prong that are spaced apart, and wherein the biasing element is disposed between the first and second prongs.

11. The seat assembly of claim 1, wherein the second end of the lever arm includes at least one opening formed therethrough, and the seat assembly further comprises a pin that is coupled to the part of the armrest and that is disposed through the at least one opening of the second end to pivotably couple the lever arm to the part of the armrest.

12. The seat assembly of claim 11, wherein the second end of the lever arm is a dual pronged end including a first prong and a second prong that are spaced apart, and wherein the at least one opening includes a first opening that extends through the first prong and a second opening that extends through the second prong and that is aligned with the first opening, and wherein the pin is disposed through the first and second openings of the first and second prongs, respectively.

13. The seat assembly of claim 1, wherein the lever arm has a proximal section that includes the second end, a distal section that includes the first end, and an elbow section that is disposed between and couples the proximal section to the distal section.

14. The seat assembly of claim 13, wherein the lever arm and the lever handle cooperate to direct movement of the lever handle along the arcuate upward direction from a nominal position to an actuated position when actuated by the hand of the seat occupant, and wherein the proximal section extends in a generally downward direction from the first end to the elbow section and the distal section extends in a generally forward direction from the elbow section to the first end when the lever handle is in the nominal position.

15. The seat assembly of claim 13, further comprising a cable that is operatively coupled to the proximal section of the lever arm to move when the lever handle is actuated for adjusting a position of the seat assembly.

16. The seat assembly of claim 15, wherein the proximal section has a slot formed therein and the cable has an end section that is disposed through the slot and that is coupled to the proximal section adjacent to the slot.

17. The seat assembly of claim 15, wherein the position of the seat assembly is adjustable at least one of fore, aft, side to side, and rotationally when the lever handle is actuated.

18. The seat assembly of claim 1, further comprising an armrest structure and an armrest housing that is coupled to the armrest structure, and wherein the second end of the lever arm is pivotably coupled to the armrest housing.

19. A method for making a seat assembly for supporting a seat occupant, the method comprising the steps of:

arranging a seat backrest extending substantially upright from a rearward seat base section of a seat base, wherein the seat base extends forward from the rearward seat base section to a forward seat base section:

disposing an armrest adjacent to the seat base, wherein the armrest extends from a rearward armrest section to a forward armrest section that is forward of the seat backrest, and wherein the armrest has an upper armrest section configured for supporting an arm of the seat occupant;

coupling a first end of a lever arm to a lever handle;

disposing the lever handle within a hand-length below the upper armrest section such that the lever handle is accessible to a hand of the seat occupant while at least a portion of the arm of the seat occupant is supported on the upper armrest section; and pivotably coupling a second end of the lever arm to a part of the armrest that is disposed below the upper armrest section such that the lever handle moves in an arcuate upward direction when actuated by the hand of the seat occupant, wherein the armrest has an outer armrest side on a side opposite the seat base and extending from the rearward armrest section to the forward armrest section below the upper armrest section, and wherein the lever handle is at least partially disposed in the outer armrest side.

* * * * *